(12) United States Patent
Goncalves Ankiewicz et al.

(10) Patent No.: US 9,604,507 B2
(45) Date of Patent: Mar. 28, 2017

(54) TREAD PROFILE OF A VEHICLE TIRE

(71) Applicant: Continental Reifen Deutschland GmbH, Hannover (DE)

(72) Inventors: Amelia Olga Goncalves Ankiewicz, Hannover (DE); Anastassia Pokutta-Paskaleva, Atlanta, GA (US); Alexander Wuest, Seelze (DE); Thomas Buchinger-Barnstorf, Wennigsen (DE); Stefan Rittweger, Hannover (DE); Thomas Fernandez, Hannover (DE); Klaudia Dobczyk, Hannover (DE)

(73) Assignee: Continental Reifen Deutschland GmbH, Hannover (DE)

( * ) Notice: Subject to any disclaimer, the term of this patent is extended or adjusted under 35 U.S.C. 154(b) by 206 days.

(21) Appl. No.: 14/533,002

(22) Filed: Nov. 4, 2014

(65) Prior Publication Data

US 2015/0053321 A1 Feb. 26, 2015

Related U.S. Application Data

(63) Continuation of application No. PCT/EP2013/058160, filed on Apr. 19, 2013.

(30) Foreign Application Priority Data

May 4, 2012 (DE) ........................ 10 2012 103 944

(51) Int. Cl.
*B60C 11/12* (2006.01)
*B60C 11/04* (2006.01)

(52) U.S. Cl.
CPC ........ *B60C 11/1204* (2013.04); *B60C 11/124* (2013.04); *B60C 11/1218* (2013.04);
(Continued)

(58) Field of Classification Search
CPC . B60C 11/12; B60C 11/1204; B60C 11/1272; B60C 11/124; B60C 11/1218;
(Continued)

(56) References Cited

U.S. PATENT DOCUMENTS 2,690,202 A * 9/1954 Walsh ................. B60C 11/0306
152/209.18
4,926,919 A * 5/1990 Hopkins ............. B60C 11/0306
152/209.22

FOREIGN PATENT DOCUMENTS

DE 100 49 936 A1 4/2002
EP 1195271 * 4/2002
(Continued)

OTHER PUBLICATIONS

International Search Report dated Jun. 28, 2013 of international application PCT/EP2013/058160 on which this application is based.

*Primary Examiner* — Eric Hug
(74) *Attorney, Agent, or Firm* — Walter Ottesen, P.A.

(57) ABSTRACT

A tread profile of a vehicle tire has profile positives such as profile blocks or tread bands that have sipes. The sipes have an approximately Ω-shaped geometry in plan view having two axial sections which are arranged approximately in an axial direction and which are arranged on a common, imaginary straight line with a spacing (a) to one another; a central bulge arranged between the axial sections, wherein the bulge has a maximum extent (b) measured in the axial direction; and, wherein a<b, such that undercuts are formed.

9 Claims, 2 Drawing Sheets

(52) U.S. Cl.
CPC ........... *B60C 11/1272* (2013.04); *B60C 11/04* (2013.01); *B60C 2011/1213* (2013.04)

(58) Field of Classification Search
CPC ............. B60C 11/04; B60C 2011/1213; B60C 11/1222; B60C 11/1281
USPC ....................................... 152/209.18–209.25
See application file for complete search history.

(56) References Cited

FOREIGN PATENT DOCUMENTS

| | | | |
|---|---|---|---|
| JP | 2000-25419 | * | 1/2000 |
| JP | 2000-25419 A | | 1/2000 |
| WO | 2009/077808 A1 | | 6/2009 |
| WO | WO 2009/077808 | * | 6/2009 |
| WO | WO 2010/136989 | * | 12/2010 |
| WO | WO 2012/001488 | * | 1/2012 |

* cited by examiner

TREAD PROFILE OF A VEHICLE TIRE

CROSS REFERENCE TO RELATED APPLICATIONS

This application is a continuation application of international patent application PCT/EP2013/058160, filed Apr. 19, 2013, designating the United States and claiming priority from German application 10 2012 103 944.5, filed May 4, 2012, and the entire content of both applications is incorporated herein by reference.

FIELD OF THE INVENTION

The invention relates to a tread profile of a vehicle tire, having profile positives such as profile blocks or tread bands that have sipes, wherein the sipes have an approximately Ω-shaped geometry in plan view:
  having two axial sections which are arranged approximately in an axial direction and which are arranged on a common, imaginary straight line with a spacing (a) to one another;
  having a central bulge arranged between the axial sections, wherein the bulge has a maximum extent (b) measured in the axial direction; and,
  wherein a<b, such that undercuts are formed.

BACKGROUND OF THE INVENTION

Sipes serve, for example in the case of utility vehicle tires, for breaking up the water film in the case of a wet roadway in order to achieve improved wet characteristics of the tread.

In the case of passenger motor vehicle tires, the sipes are formed in vehicle tires for use under winter driving conditions and serve for example for improving driving characteristics on winter roads by virtue of an increased number of gripping edges being provided and by virtue of the snow that is received in the sipes increasing the adhesion of the tire by way of a snow-on-snow intermeshing action.

A tread profile as per the preamble has become known from DE 100 49 936 B4. DE 100 49 936 B4 relates to a tread profile composed of profile blocks. The profile blocks have sipes with an a-shaped or jigsaw puzzle piece-like geometry. Such a design of the sipes generates interlocking and thus stiffening of the profile blocks or bands in all directions. The interlocking is obtained owing to the mutual support effects, in particular owing to the bulge, of opposite sipe walls.

The interlocking is advantageous in particular in the new state of the tread profile because the profile depth is high and the profile sections formed by the sipes have a high degree of mobility. The interlocking leads to an advantageous stiffening of the profile block or band in all directions.

When the tread profile is in the run-in state, the profile blocks or bands are inherently stiffer than in the new state owing to the relatively small remaining profile depth. Further stiffening by interlocking is then disadvantageous.

SUMMARY OF THE INVENTION

It is the object of the invention to provide a tread profile of a vehicle tire which exhibits good handling and good dry braking characteristics, and also good wet performance, over its service life.

The object is achieved in that the maximum extent of the bulge measured in the circumferential direction decreases continuously over the depth profile of the sipe, such that the sipe ends in a straight line at the sipe base.

According to the invention, a tread profile is created which, in the new state—and in a plan view of a sipe—generates interlocking effects in all directions between adjacent profile block or band sections by way of an approximately Ω-shaped geometry of the sipe. The Ω-shaped geometry may likewise be described as a mushroom-like geometry. Optimum stiffness of the profile elements is obtained owing to the interlocking effects in all directions.

In the depth profile, the sipe has a geometry that deviates from the new state by virtue of the maximum extent of the bulge—as measured in the circumferential direction—decreasing continuously. This is attained by way of a decrease in the extent of the bulge in the circumferential direction, whereby a continuously decreased interlocking action, and thus continuously decreased stiffening of the profile elements, is achieved.

With this measure, the tread profile is adapted in continuous fashion to the higher stiffness of the run-in tread profile.

A tread profile having a so-called "3D sipe" is created which exhibits good handling, good dry braking characteristics and also good wet performance over its service life.

"Axial direction" refers to the direction along the tire axis.

"Circumferential direction" refers to the direction along the tire rolling movement.

"Radial direction" means the direction from the tire central point to the tread.

"Sipe base" refers to that line of a sipe which is closest to the tire central point.

"Width of the sipe" refers to the extent of a sipe perpendicular to its longitudinal extent.

"Profile depth" or "sipe depth" refers to the maximum difference, in the radial direction, between elements of a profile of a sipe.

It is expedient if the angle formed, as viewed in the cross section of the sipe, over the depth profile of the sipe by those two points of the sipe which are furthest apart in the circumferential direction is at most 20°.

It is advantageous if the axial sections have a depth profile in a radial direction, whereas the bulge has a depth profile that deviates from the radial direction.

In another embodiment of the invention, both the axial sections and the bulge have a depth profile that deviates from the radial direction.

It is expedient if, in a plan view of the sipe, the directional changes thereof are formed by radii.

It is advantageous if the sipe has a width of 0.5 mm to 3.0 mm, preferably of approximately 0.8 mm, at the sipe base.

A tread profile of this type is intended for use in a vehicle tire, preferably a utility vehicle tire or a passenger motor vehicle tire.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
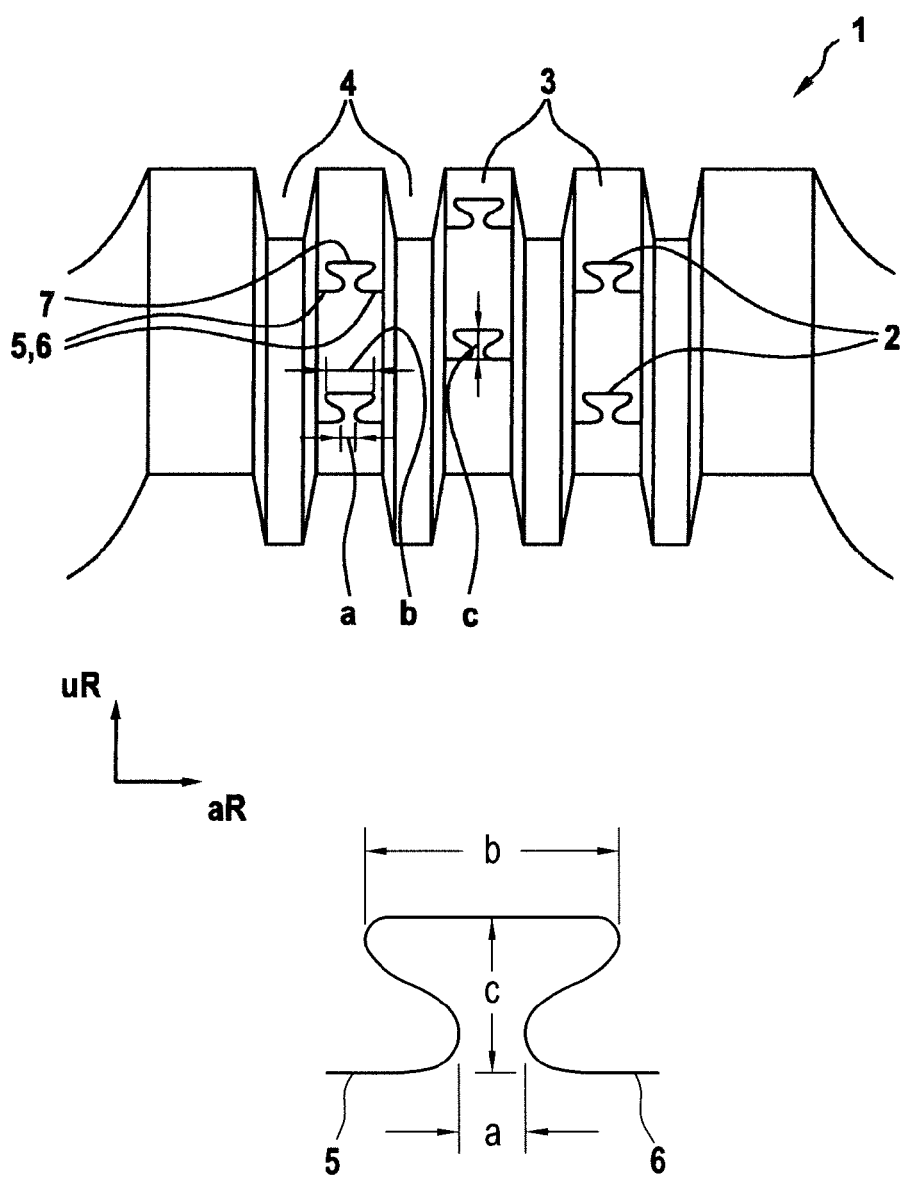
FIG. 1 shows a three-dimensional view of a tread profile of a vehicle tire having sipes in the profile bands.

FIG. 1 shows a three-dimensional view of a tread profile 1 of a vehicle tire having sipes 2 in the profile bands 3. Each profile band 3 is delimited on both sides by circumferential grooves 4. The sipe 2 extends all the way through the profile band 3 in an axial direction aR. The sipe 2 has—in a plan view—an approximately Ω-shaped or mushroom-like geometry composed of two axial sections (5, 6), which are arranged approximately in the axial direction aR on a common, imaginary straight line and which are spaced apart from one another with a spacing (a). Further, the sipe 2 has a central bulge 7 which is arranged between the sections (5, 6) and which is oriented approximately in a circumferential direction uR and which has a maximum extent (b) measured in the axial direction aR, wherein a<b. The bulge 7 has a maximum extent (c) in the circumferential direction uR. In a plan view of the sipe 2, all directional changes in the sipe profile are formed by radii.

Figure 2:
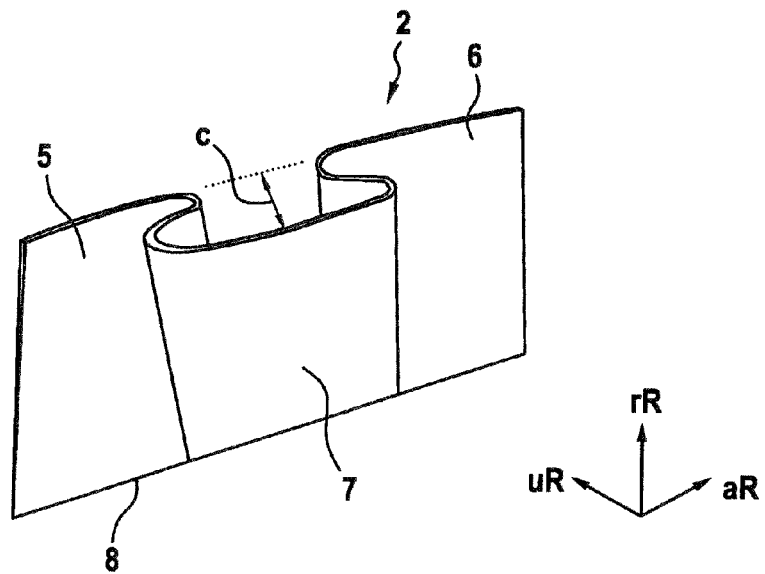
FIG. 2 is a three-dimensional illustration of a sipe of the tread profile.

FIG. 2 has a three-dimensional illustration of a sipe 2 of the tread profile 1 of FIG. 1. In the new state, the sipe 2 has the geometry described in FIG. 1. Over the depth profile of the sipe 2, the maximum extent of the bulge (c)—measured in the circumferential direction—decreases such that the sipe 2 ends in an approximately axially running straight line at the sipe base 8.

Figure 3:
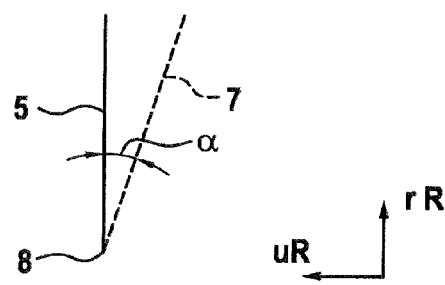
FIG. 3 shows a cross section of the sipe from FIG. 2.

FIG. 3 shows a cross section of the sipe from FIG. 2. The solid line shows the depth profile of an axial section 5, whereas the dashed line shows the depth profile of the furthest remote point of the bulge 7. The depth profile formed over the depth profile of the sipe 2 by those two points of the sipe which are furthest remote in the circumferential direction is V-shaped, with two legs of the V formed as straight lines. The axial sections 5 have a depth profile in the radial direction, whereas the bulge 7 has a depth profile that deviates from the radial direction. The angle α enclosed by the two legs of the V is at most 20°, and in this case is 5°.

Figure 4:
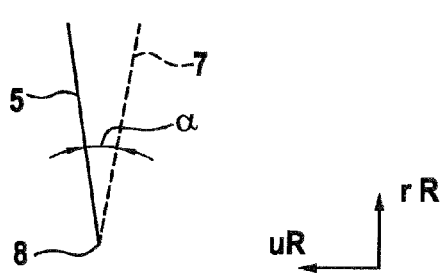
FIG. 4 shows a cross section of a further sipe.

FIG. 4 shows a cross section of a further sipe 2. The cross section differs from the cross section of FIG. 3 in that the axial sections 5 and the bulge 7 have a depth profile that deviates from the radial direction. The angle α enclosed by the two legs of the V is at most 20°, in this case 5°.

It is understood that the foregoing description is that of the preferred embodiments of the invention and that various changes and modifications may be made thereto without departing from the spirit and scope of the invention as defined in the appended claims.

LIST OF REFERENCE SIGNS

Part of the Description

1 Tread profile
2 Sipe
3 Profile band
4 Circumferential groove
5 Axial section
6 Axial section
7 Bulge
8 Sipe base
a Axial spacing between the sections
b Maximum extent of the bulge in the axial direction
c Maximum extent of the bulge in the circumferential direction
rR Radial direction
aR Axial direction
uR Circumferential direction

What is claimed is:

1. A tread profile of a pneumatic vehicle tire defining an axial direction, a radial direction and a circumferential direction, the tread profile comprising:
   profile positives having sipes;
   said sipes having a sipe base and defining a depth profile and, when viewed in top plan, an approximately Ω-shaped geometry having:
      two axial sections arranged in the axial direction and conjointly defining a common imaginary straight line, said two axial sections being arranged on said imaginary straight line at a distance (a) from each other;
      a central bulge arranged between said two axial sections and having a maximum expansion (b) measured in the axial direction;
   said distance (a) being less than said maximum expansion (b) so as to form undercuts; and,
   said central bulge having a maximum extension (c) measured in the circumferential direction and continuously decreasing over said depth profile such that said sipes end in a straight line at said sipe base,
   wherein said two axial sections and said central bulge have a depth profile deviating from the radial direction.

2. The tread profile of claim 1, wherein, in plan view, said sipes have directional changes formed by radii over the course of said sipes.

3. The tread profile of claim 1, wherein said sipes have a width lying in a range of 0.5 mm to 3.0 mm at said sipe base.

4. The tread profile of claim 1, wherein said sipes have a width of approximately 0.8 mm.

5. The tread profile of claim 1, wherein said profile positives are profile blocks or tread bands.

6. A tread profile of a pneumatic vehicle tire defining an axial direction, a radial direction and a circumferential direction, the tread profile comprising:
   profile positives having sipes;
   said sipes having a sipe base and defining a depth profile and, when viewed in top plan, an approximately Ω-shaped geometry having:
      two axial sections arranged in the axial direction and conjointly defining a common imaginary straight line, said two axial sections being arranged on said imaginary straight line at a distance (a) from each other;
      a central bulge arranged between said two axial sections and having a maximum expansion (b) measured in the axial direction;
   said distance (a) being less than said maximum expansion (b) so as to form undercuts; and,
   said central bulge having a maximum extension (c) measured in the circumferential direction and continuously decreasing over said depth profile such that said sipes end in a straight line at said sipe base, wherein:
   said sipes have a first point and a second point which are disposed at a greatest distance from each other in the circumferential direction;
   said sipes have an angle α which when viewed in cross-section of said sipes is defined by said first and said second points of said sipes over said depth profile; and,
   said angle α is at most 20°.

7. The tread profile of claim 6, wherein:
   said two axial sections have a depth profile in the radial direction; and,
   said central bulge has a depth profile deviating from the radial direction.

8. A pneumatic vehicle tire defining a radial direction, a circumferential direction and an axial direction, the pneumatic vehicle tire comprising:
  a tread profile including:
    profile positives having sipes;
    said sipes having a sipe base and defining a depth profile and, when viewed in top plan, an approximately Ω-shaped geometry having:
      two axial sections arranged in the axial direction and conjointly defining a common imaginary straight line, said two axial sections being arranged on said imaginary straight line at a distance (a) from each other;
      a central bulge arranged between said two axial sections, said central bulge having a maximum expansion (b) measured in the axial direction;
      said distance (a) being less than said maximum expansion (b) so as to form undercuts; and,
      said central bulge having a maximum extension (c) measured in the circumferential direction and continuously decreasing over said depth profile such that said sipes end in a straight line at said sipe base,
    wherein said two axial sections and said central bulge have a depth profile deviating from the radial direction.

9. The pneumatic vehicle tire of claim 8, wherein the tire is configured for a car or a commercial vehicle.

* * * * *

UNITED STATES PATENT AND TRADEMARK OFFICE
CERTIFICATE OF CORRECTION

PATENT NO. : 9,604,507 B2
APPLICATION NO. : 14/533002
DATED : March 28, 2017
INVENTOR(S) : A. Goncalves Ankiewicz et al.

Page 1 of 1

It is certified that error appears in the above-identified patent and that said Letters Patent is hereby corrected as shown below:

In the Specification

In Column 1:
Line 43: delete "a-shaped" and insert --Ω-shaped-- therefor.

Signed and Sealed this
Twenty-third Day of May, 2017

Michelle K. Lee
*Director of the United States Patent and Trademark Office*